Patented Mar. 6, 1928.

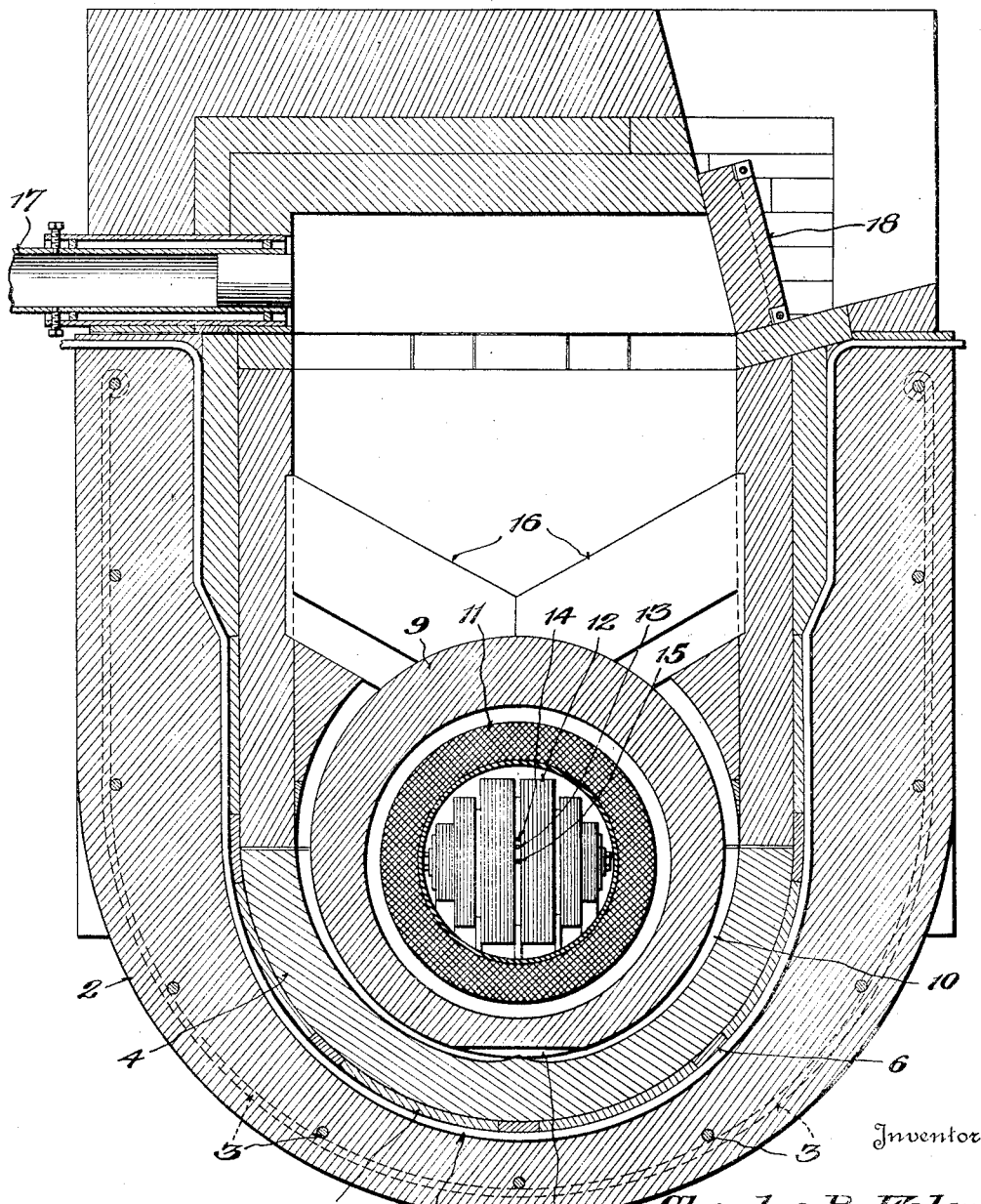

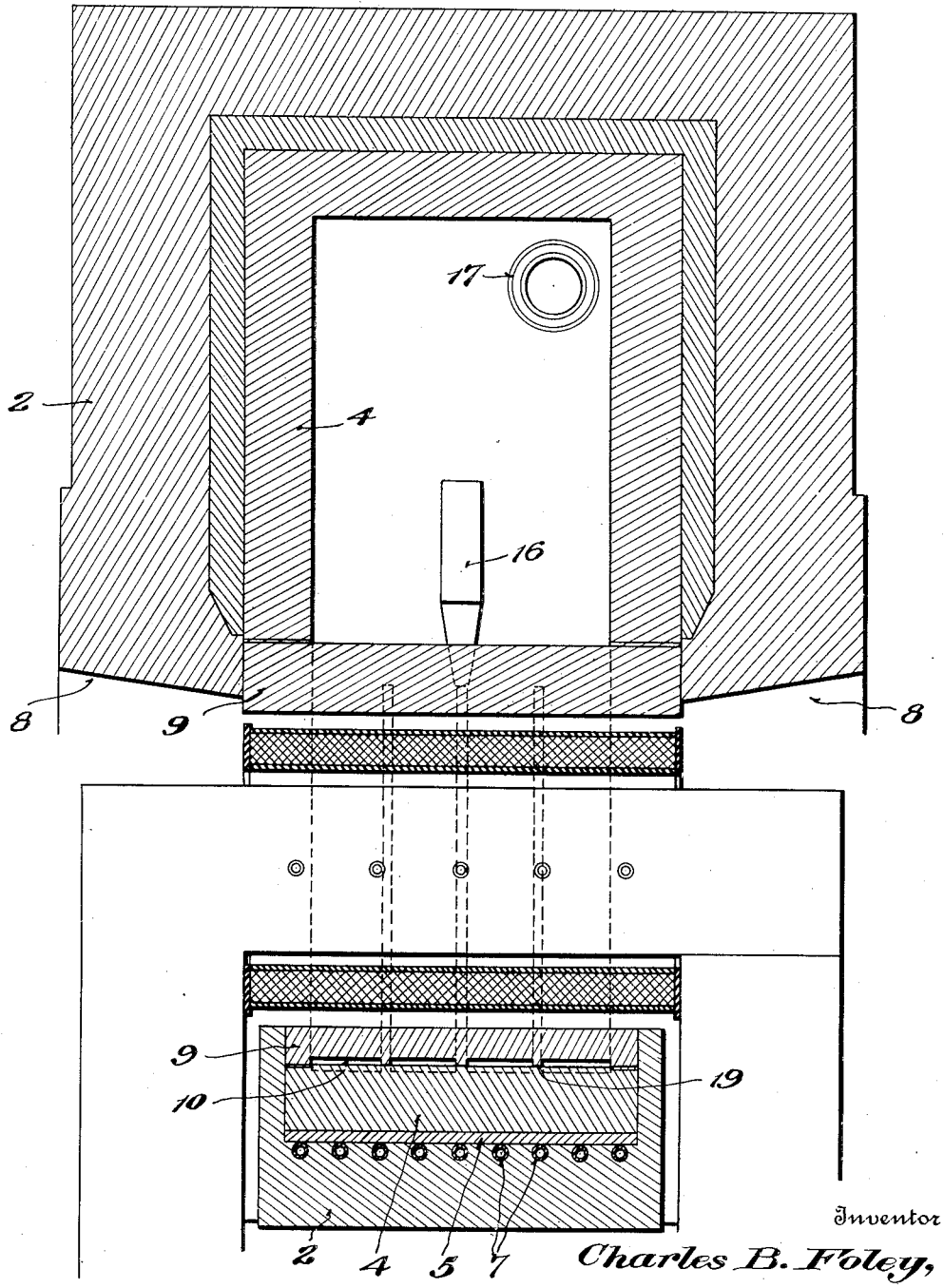

1,661,173

UNITED STATES PATENT OFFICE.

CHARLES B. FOLEY, OF FORT WAYNE, INDIANA, ASSIGNOR TO CHARLES B. FOLEY, INC., OF NEW YORK, N. Y., A CORPORATION OF NEW YORK.

ELECTRIC FURNACE.

Application filed March 23, 1922, Serial No. 545,983. Renewed July 27, 1926.

The present invention relates to electric induction furnaces of the crucible type, and is particularly directed to improvements in the induction furnace described in my copending application, Serial Number 139,437, filed Dec. 28, 1916.

In the application referred to I have disclosed a furnace comprising a container of refractory material having a tube passing therethrough near the bottom, the cylindrical periphery of the tube forming in conjunction with the cylindrical bottom of the container a channel of arc formation opening upwardly through flaring mouths, the interior of the tube defining a bore through the lower part of the container for the reception of a core and primary winding. The furnace is adapted to receive molten metal and form it into a relatively deep pool with an arc, or loop, of molten metal depending from the bottom thereof, the said arc, or loop, being linked with current inducing means constituted by the core and primary winding. When alternating voltages are impressed on the terminals of the primary winding, alternating currents are induced in the loop and pool, whereby the metal is heated and stirred.

The object of the present invention is to increase the electrical efficiency of the furnace described in my prior application, and to render it more rugged and durable under operating conditions. These objects are carried out by certain structural modifications which will be fully described hereinafter and then particularly claimed.

In the accompanying drawings, Figure 1 is a vertical section through an induction furnace embodying my improvements; and Figure 2 is a similar section taken at right angles to Figure 1.

The furnace comprises an outer shell, or container, 2, composed of concrete reinforced in all directions by steel rods 3, and made relatively massive so as to be practically inflexible under all operating conditions of the furnace. The container has an inner lining 4 composed of graphite composition, a material which becomes slightly waxy under the intense heat developed in the molten bath of metal. This waxy condition of the surface layers of said lining prevents the development of cracks therein, as fully explained in my copending application, Serial No. 545,984, filed March 23, 1922, allowed November 13, 1923.

Between the shell 2 and lining 4 is a layer 5 composed of refractory material possessing high heat insulating value, such as silocel which is composed mainly of the natural mineral product variously known as kieselguhr, or infusorial earth. As silocel is a porous brittle body easily crushed, I insert at suitable intervals in the silocel layer blocks 6 of graphite composition, for the purpose of taking up the crushing loads imposed by the head of molten metal together with the pressures set up by thermal and electro-dynamic forces under operating conditions.

A series of pipes 7 are laid in parallel between the silocel layer 5 and concrete shell 2, for the purpose of providing a refrigerating zone between said shell and lining 4. These pipes are embedded in the inner surface of the concrete shell and are adapted to communicate on one side of the furnace with a common head to which water is supplied under pressure, and to communicate on the opposite side of the furnace with a similar outlet head. Water consequently flows through the pipes in parallel when the furnace is in operation. The refrigerating zone thus produced between the concrete shell and refractory lining prevents decomposition of the concrete by the intense heat to which it would otherwise be subjected, eliminates strains in the concrete shell by maintaining all parts thereof at substantially room temperature, and prevents the development of cracks in the lining, all as fully set forth and explained in my copending application, Serial No. 545,984, above referred to.

The concrete shell has apertures, or windows, 8 formed in opposite sides thereof in coaxial relation. Cemented in registry with these windows is a refractory tube 9 of graphite composition. The outer periphery of the tube forms in conjunction with the sides and bottom of the crucible one or more arc-shaped channels 10, which are adapted to receive molten metal and shape it into one or more loops, whereby the molten metal is brought into inductive relation with a transformer primary 11 and core 12 which pass through the bore of the tube.

In order to form the arc-shaped channel, or channels, 10, I preferably sculpture in the lower portion of the lining 4 one or more arcuate grooves. In the particular furnace illustrated there are four grooves and the tube 9 rests on the ribs formed by the construction of said grooves.

Numeral 13 designates the axis of the periphery of tube 9 and 14 designates the axis of the outer walls of channels 10. Since the axis 14 is located above the axis 13, the channels defined by the grooves and periphery of the tube gradually increase in cross section from a minimum value at their lowest portions. Numeral 15 designates the axis of the bore of the tube and of the primary coil 11. Since the axis 15 is located below the axis 13 the tube wall will have a maximum thickness at its uppermost part, gradually decreasing in thickness to a minimum at its lowest part. The purpose of this construction is to strengthen the upper walls of the tube where it is subjected to being hit by solid ingots of metals which are introduced into the furnace from time to time. An additional advantage secured by making the tube thinnest at its lowest part resides in the fact that the loops of metal are thereby brought into close inductive relation with the primary inducing means, thus improving the power factor of the furnace. In order to bring the lower parts of the secondary loops into still closer relation with respect to the primary inducing means and to direct the reactive electromagnetic forces in such directions with respect to the lower parts of said loops as to produce a positive and vigorous kick on the metal, I sculpture grooves 19 in the lower periphery of tube 9, these grooves being cut on chords of circles defining the outer periphery of the tube and cooperating with walls of lining 4 to form substantially straight channel portions which are continued by the curved portions of the channels. The outer walls of these channel portions, however, do not lie in a single plane, but are inclined downwardly from a central plane, as indicated by the dotted lines, Fig. 2.

In order to brace the tube 9 against upwardly acting hydraulic pressure tending to float said tube, I provide the blocks 16, which as clearly shown in Fig. 1 have their outer ends anchored in lining 14 and their inner ends abutting along the central plane of the furnace, the lower inner corners of said blocks being cut away on the arc of a circle to conform with and fit the periphery of the tube. The blocks are inclined downwardly, thereby forming struts which rigidly resist upwardly directed hydrostatic pressure on the tube. These blocks additionally serve to prevent injury to the tube from the falling thereon of large ingots of metal.

In the furnace constructed in accordance with my copending application, Serial No. 139,437, filed Dec. 28, 1916, the outer walls of the secondary channel are cylindrically curved to points adjacent the horizontal plane passing through the center of the primary coil and then extend straight upwardly, or tangentially, therefrom, producing a secondary channel having wide flaring mouths. In the furnace forming the subject matter of the present invention the channels are curved throughout their entire extent, as shown in Fig. 1, extending at their upper ends inwardly towards the central axis of the furnace to a very substantial extent. This provides a construction in which the secondary constituted by the molten metal in the channels and pool has a relatively large ratio of ohmic to inductive resistance, as compared with the secondary formed by the prior construction referred to, whereby the power factor is materially improved.

The present furnace, like the furnace described in my copending application filed of even date herewith, is adapted to be tiltably mounted, and has a tapping nozzle 17 through which the metal is poured when the furnace is placed in tilted position. The furnace is entirely enclosed, there being a sliding closure 18 through which the charges are introduced.

Having particularly described a furnace embodying my improvements, without intending to limit myself to the exact details described, what I claim as new and desire to secure by Letters Patent is:—

1. An electric induction furnace, comprising a container having coaxial windows formed in opposite sides thereof, a tube supported in registry with said windows and cooperating with the sides and bottom of said container to form a closed channel opening upwardly into the container on opposite sides thereof, said tube having the axis of its periphery located above the axis of its bore.

2. An electric induction furnace, comprising a container having windows formed in opposite sides thereof, a tube supported in registry with said windows and cooperating with the sides and bottom of said container to form a closed channel opening into said container, the thickness of the tube walls increasing from a minimum at the lowest portion thereof.

3. An electric induction furnace, comprising a crucible having a tube passing therethrough and cooperating with the sides and bottom thereof to form a closed channel opening into the crucible on opposite sides, the axis of the bore of said tube being located a substantial distance below the axis of the periphery thereof.

4. An electric induction furnace, comprising a container having coaxial windows formed in opposite sides thereof, a tube supported in registry with said windows and cooperating with the sides and bottom of said container to form a closed channel opening upwardly and inwardly towards the central axis of the furnace, the outer wall of said channel being curved on an axis located substantially above the axis of the tube periphery and the axis of the latter being located substantially above the axis of the tube bore, and current inducing means passing through said bore.

5. An electric induction furnace comprising a crucible having a tube passing therethrough and cooperating with the sides and bottom thereof to form a closed channel opening into the crucible on opposite sides, the outer wall of said channel being curved on an axis located substantially above the axis of the tube periphery and the axis of the latter being located substantially above the axis of the tube bore, and current inducing means passing through said bore.

6. An electric induction furnace, comprising a crucible having a tube passing therethrough and cooperating with the sides and bottom thereof to form a closed channel opening into the crucible on opposite sides, and bracing means for said tube resisting upwardly directed hydrostatic pressure thereon.

7. An electric induction furnace comprising a crucible having a tube passing therethrough and cooperating with the sides and bottom thereof to form a closed channel opening into the crucible on opposite sides, and bracing means for said tube comprising a pair of blocks having their outer ends anchored in the sides of the crucible and abutting at their inner ends, said blocks being downwardly inclined and being cut away at their lower inner corners to fit the tube periphery.

8. An electric induction furnace, comprising a crucible having a tube passing therethrough and cooperating with the sides and bottom thereof to form a closed channel opening into the crucible on opposite sides, the axis of the tube bore being located a substantial distance below the axis of the tube periphery to form thickened upper tube walls, and bracing means for said tube resisting upwardly directed hydrostatic pressure.

9. An electric induction furnace, comprising a crucible having a tube passing therethrough and cooperating with the bottom and sides thereof to form a closed channel opening into the crucible on opposite sides, the axis of the tube bore being located a substantial distance below the axis of the tube periphery, and bracing means for said tube comprising a pair of blocks having their outer ends anchored to the sides of the crucible and abutting at their inner ends centrally over the tube, said blocks being downwardly inclined and being cut away at their lower inner corners to fit the tube periphery.

10. An electric induction furnace comprising a crucible having a tube passing therethrough and cooperating with the sides and bottom thereof to form a closed channel opening into the crucible on opposite sides, the lower portion of said channel being formed by a groove in the crucible lining inclining downwardly on both sides from the central plane of the crucible and a straight groove formed on the chord of a circle defining the periphery of the tube.

11. An electric induction furnace, comprising a crucible having a tube passing therethrough and cooperating with the sides and bottom thereof to form a closed channel opening into the crucible on opposite sides, the lower portion of said channel comprising a straight groove formed on the chord of a circle defining the tube periphery.

12. An electric induction furnace comprising a crucible composed of a rigid inflexible shell, a relatively thin refractory lining and a series of conduits for a refrigerant between the shell and lining, said shell having coaxial windows formed in opposite sides thereof, a tube supported in registry with said windows and cooperating with the sides and bottom of said crucible to form a plurality of parallel channels opening into the crucible on opposite sides, the lower portions of said channels being formed by parallel grooves in the lining and straight grooves formed on chords of circles defining the periphery of said tube.

13. An electric induction furnace, comprising a crucible having a tube passing through the lower portion thereof and cooperating with the sides and bottom thereof to form a closed channel opening upwardly and inwardly towards the central axis of said crucible, the outer wall of said channel being curved on an axis located substantially above the axis of the tube periphery and the axis of the latter being located substantially above the axis of the tube bore.

In testimony whereof I hereunto affix my signature.

CHARLES B. FOLEY.